(12) United States Patent
Kurokawa

(10) Patent No.: US 10,341,517 B2
(45) Date of Patent: Jul. 2, 2019

(54) IMAGE FORMING APPARATUS AND METHOD FOR CONTROLLING THE IMAGE FORMING APPARATUS

(71) Applicant: KYOCERA Document Solutions Inc., Osaka (JP)

(72) Inventor: Yuichiro Kurokawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/032,935

(22) Filed: Jul. 11, 2018

(65) Prior Publication Data

US 2019/0028601 A1 Jan. 24, 2019

(30) Foreign Application Priority Data

Jul. 18, 2017 (JP) .................................. 2017-139132

(51) Int. Cl.
*H04N 1/00* (2006.01)
*H04N 1/12* (2006.01)
*B41J 2/145* (2006.01)
*B41J 3/00* (2006.01)
*G06F 3/12* (2006.01)

(52) U.S. Cl.
CPC .......... *H04N 1/00602* (2013.01); *B41J 2/145* (2013.01); *B41J 3/00* (2013.01); *H04N 1/0061* (2013.01); *H04N 1/00209* (2013.01); *H04N 1/1225* (2013.01); *H04N 2201/0094* (2013.01)

(58) Field of Classification Search
None
See application file for complete search history.

(56) References Cited

U.S. PATENT DOCUMENTS

2012/0207486 A1* 8/2012 Egawa ............... G03G 21/1647
399/21

FOREIGN PATENT DOCUMENTS

JP 2002-331648 A 11/2002

* cited by examiner

*Primary Examiner* — Dov Popovici
(74) *Attorney, Agent, or Firm* — Stein IP, LLC

(57) ABSTRACT

In an image forming apparatus, a first motor causes a first rotor to rotate. The first motor rotates based on a first drive signal. A second motor causes a second rotor to rotate. The second motor rotates based on a second drive signal. A reading unit is provided between the first rotor and the second rotor. Based on a read signal, the reading unit reads a paper sheet being conveyed line by line. In a first period, a read signal generation unit generates the read signal in accordance with a frequency of the first drive signal. In a second period, the read signal generation unit generates, as the read signal, a signal for reading the paper sheet being conveyed at a reference speed.

10 Claims, 9 Drawing Sheets

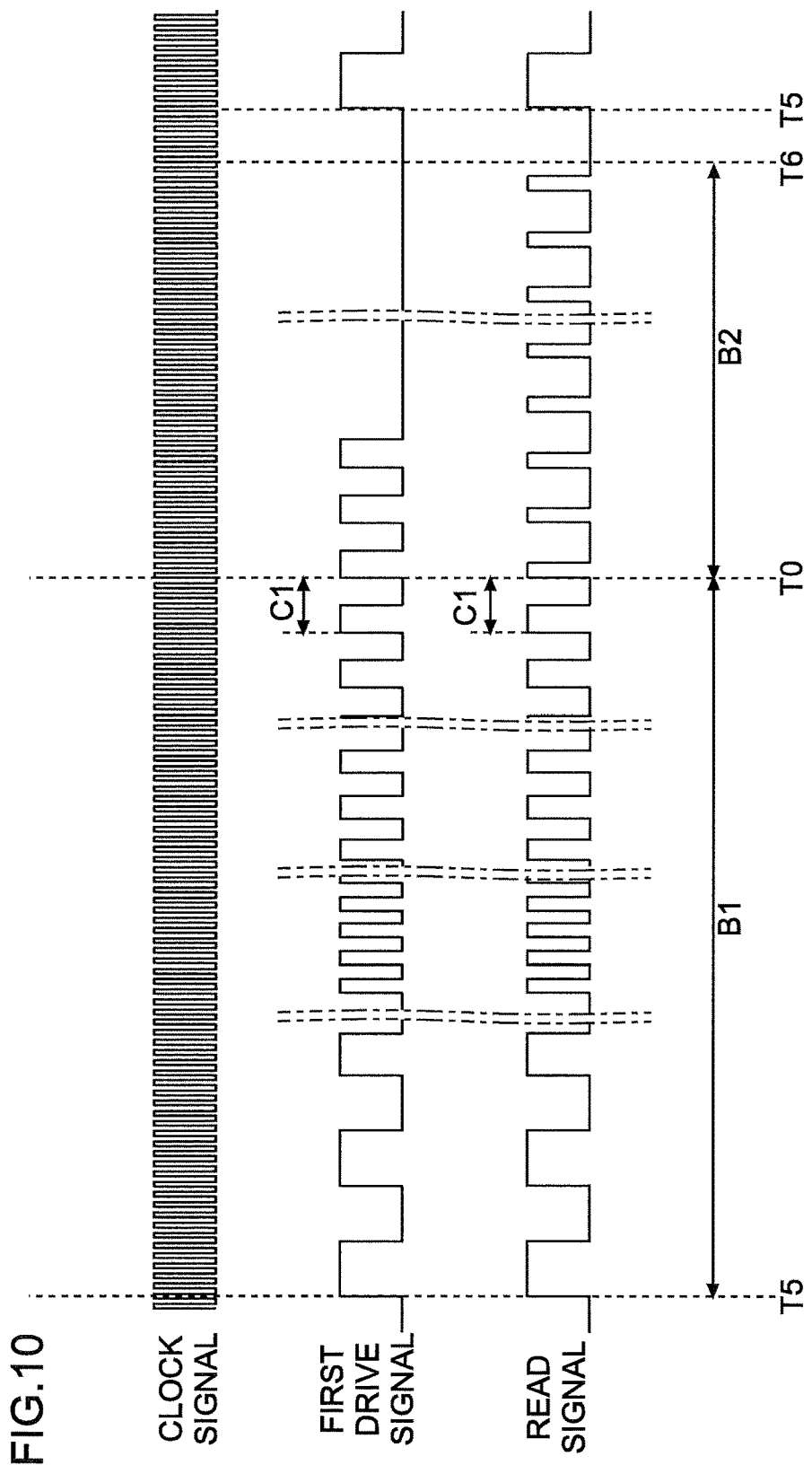

IMAGE FORMING APPARATUS AND METHOD FOR CONTROLLING THE IMAGE FORMING APPARATUS

INCORPORATION BY REFERENCE

This application is based upon and claims the benefit of priority from the corresponding Japanese Patent Application No. 2017-139132 filed on Jul. 18, 2017, the entire contents of which are incorporated herein by reference.

BACKGROUND

The present disclosure relates to an image forming apparatus that conveys a paper sheet and includes an image sensor provided on a conveyance path.

There are various types of image forming apparatuses such as a printer, a multi-functional peripheral, a copy machine, and a facsimile apparatus. These types of image forming apparatuses perform printing on a paper sheet while conveying the paper sheet. Some types of image forming apparatuses perform detection related to a paper sheet being conveyed. There is known one example of a technique related to such detection performed in the process of conveyance as described below.

Specifically, there is a disclosure of an image recording apparatus that, with respect to a recording medium being conveyed in a sub-scanning direction, records an image on the recording medium in a main scanning direction, detects a density on the recording medium on an upstream side beyond a paper sheet tip end position in the sub-scanning direction when a recording head performs recording of a first band of the image with respect to the recording medium, and determines, based on a result of the detection, a width and a position of the recording medium. An infrared sensor is used to detect the density. According to this configuration, before printing of the first band is performed with respect to a paper sheet or by the time when printing of the first band is performed with respect thereto, a density on a recording medium is detected. This is intended to determine a width and a position of the recording medium.

A reading sensor may be provided on a conveyance path. The reading sensor reads a paper sheet being conveyed (a paper sheet with respect to which printing is to be performed). Based on a result of the reading, detection related to the paper sheet is performed. In order to perform accurate detection, preferably, a resolution of an image obtained through the reading does not vary. In order to maintain a constant resolution of an image obtained, it is required that a reading width per line (per dot) be made uniform. To this end, a line reading cycle of the reading sensor may be set using a pulse cycle for causing a paper sheet conveyance motor to rotate. For example, such a reading cycle is set to an integral multiple of a pulse cycle. Thus, regardless of a rotational speed of the motor, upon every given amount of conveyance of a paper sheet, the paper sheet can be read by an amount corresponding thereto.

Meanwhile, in order to improve productivity, a paper sheet conveyance speed may be switched on a conveyance path. For example, there are provided a plurality of motors for causing rotors on the conveyance path to rotate. Further, the motors may be made to vary in rotational speed. In this case, a speed of each of the motors is individually accelerated/decelerated. Due to a difference in acceleration/deceleration pattern between the motors, a conveyance speed at which a paper sheet is conveyed while passing through the reading sensor may fluctuate.

When a reading cycle is set on the basis of a drive pulse of a particular one of the motors, due to a difference in acceleration/deceleration pattern between the motors, there may occur variations in reading width per line. Consequently, in a case where a paper sheet is conveyed by use of a plurality of motors varying in acceleration/deceleration control pattern, there is a problem that a reading width per line (a resolution) cannot be made uniform.

In the above-mentioned known technique, before printing of a first band of an image is performed with respect to a paper sheet or by the time when printing of the first band is performed with respect thereto, a position or the like of a recording medium can be detected. However, no mention is made of a change in paper sheet conveyance speed. Consequently, the above-described problem could not be solved by the known technique thus described.

SUMMARY

An image forming apparatus of the present disclosure includes a first motor, a first signal generation unit, a second motor, a second signal generation unit, a reading unit, and a read signal generation unit. The first motor causes a first rotor that conveys a paper sheet to rotate. The first motor rotates at a speed depending on a frequency of a first drive signal. The first signal generation unit generates the first drive signal. The second motor causes a second rotor to rotate. The second rotor is provided downstream beyond the first rotor in a conveyance direction and conveys the paper sheet. The second motor rotates at a speed depending on a frequency of a second drive signal. The second signal generation unit generates the second drive signal. The reading unit is provided between the first rotor and the second rotor. The reading unit includes an image sensor. Based on a read signal, the reading unit reads line by line the paper sheet conveyed thereto. The read signal generation unit generates the read signal. At a time point when the paper sheet has arrived at the first rotor, the first signal generation unit maintains the first motor in a stopped state. After a start of rotation of the first rotor, the first signal generation unit accelerates a rotational speed of the first motor and subsequently decelerates the rotational speed so that the first drive signal has a reference frequency. After the first drive signal has been set to have the reference frequency, the first signal generation unit stops the first motor before arrival of a succeeding paper sheet at the first rotor. The reference frequency is such a frequency that a paper sheet conveyance speed of the first rotor becomes a reference speed. The second signal generation unit generates the second drive signal so that a paper sheet conveyance speed at which the second rotor conveys the paper sheet becomes the reference speed. In a first period from after a start of rotation of the first rotor until a preset switching time point, the read signal generation unit generates the read signal so that, in accordance with a frequency of the first drive signal, every line of the paper sheet is read upon conveyance thereof. In a second period from the switching time point until a rear end of the paper sheet has passed beyond the image sensor, the read signal generation unit generates the read signal so that every line of the paper sheet being conveyed at the reference speed is read upon conveyance thereof. The switching time point is provided within a time period in which the second rotor has started to convey the paper sheet and the first drive signal has the reference frequency.

Further features and advantages of the present disclosure will be made even more apparent from an embodiment described below.

BRIEF DESCRIPTION OF THE DRAWINGS

FIG. 10 is a diagram showing one example of a timing chart of a first drive signal and the read signal according to the second modification example.

DETAILED DESCRIPTION

In a configuration in which a conveyance rotor is caused to rotate by use of different motors at front and rear of an image sensor, the present disclosure maintains a constant resolution of an image obtained through reading. With reference to FIG. 1 to FIG. 10, the following describes an embodiment of the present disclosure. In the following description, a printer 100 is used as an example of an image forming apparatus. The printer 100 is of an ink-jet type.

(Outline of Printer 100)

Figure 1:
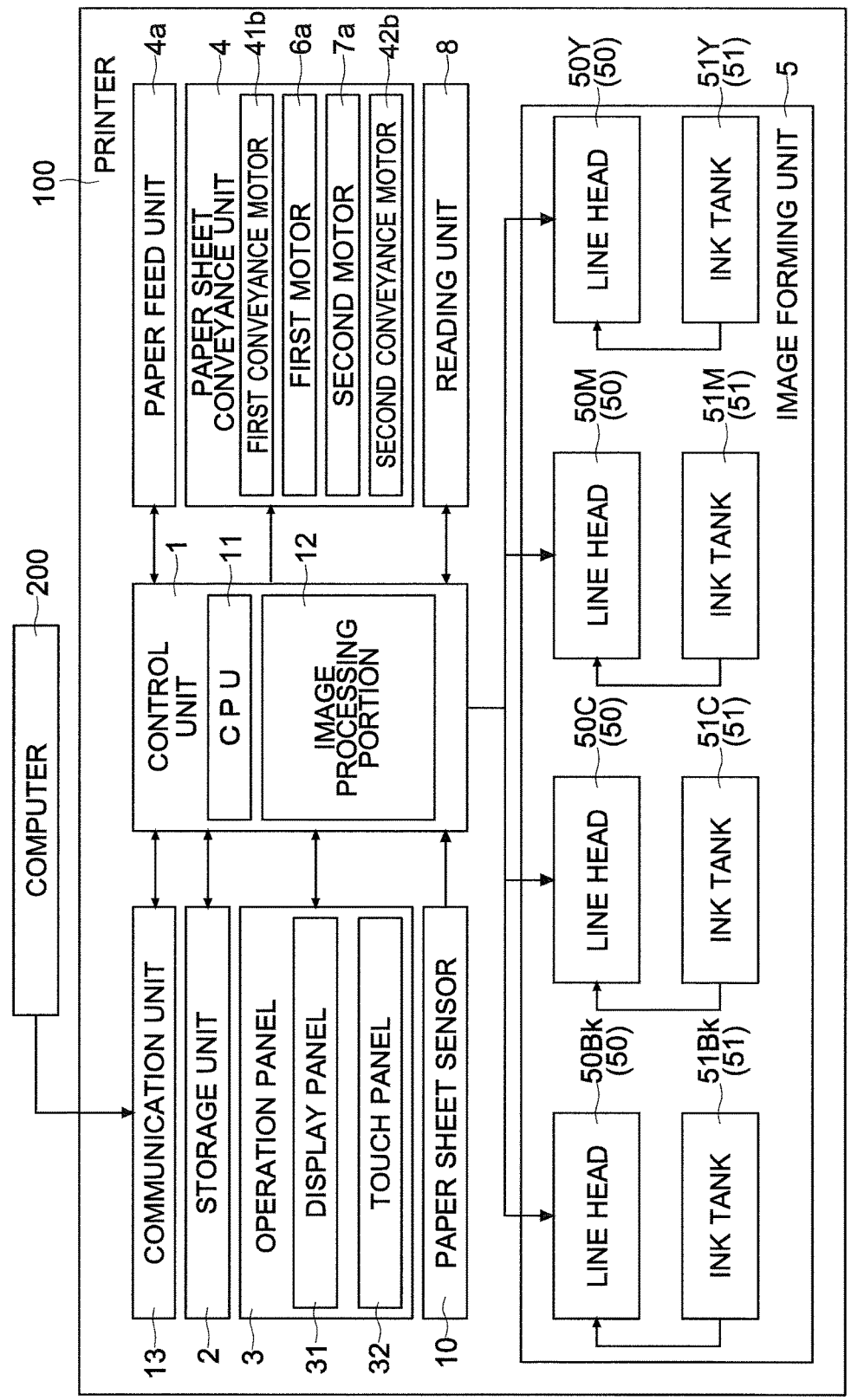
FIG. 1 is a diagram showing one example of a printer according to an embodiment.
Figure 2:
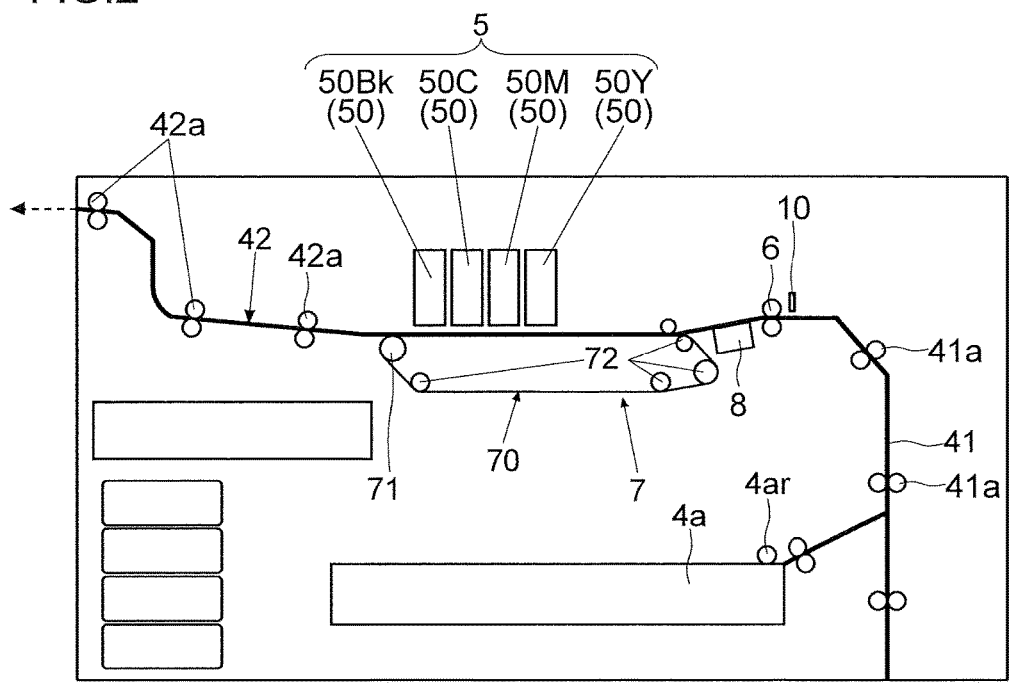
FIG. 2 is a diagram showing one example of the printer according to the embodiment.

First, with reference to FIG. 1 and FIG. 2, a description is given of an outline of the printer 100 according to the embodiment. The printer 100 includes a control unit 1. The control unit 1 controls various portions of the printer 100. The control unit 1 includes a CPU 11 and an image processing portion 12. Based on control programs and control data stored in a storage unit 2, the CPU 11 performs computations and processing. The storage unit 2 includes a non-volatile storage device such as a ROM, an HDD, or a flash ROM. The storage unit 2 also includes a volatile storage device such as a RAM. The image processing portion 12 performs image processing with respect to image data to be used for printing.

The printer 100 includes an operation panel 3. The operation panel 3 includes a display panel 31 and a touch panel 32. The display panel 31 displays a setting screen and information. The display panel 31 displays operation images such as of a key, a button, and a tab. The touch panel 32 detects a touch operation performed with respect to the display panel 31. Based on an output of the touch panel 32, the control unit 1 recognizes an operated one of the operation images. The control unit 1 thus recognizes a setting operation performed by a user.

The printer 100 includes a paper feed unit 4a, a paper sheet conveyance unit 4, and an image forming unit 5. The paper feed unit 4a houses a paper sheet bundle. The paper feed unit 4a includes a paper feed roller 4ar. In a printing job, the control unit 1 controls the paper feed roller 4ar to rotate. Rotation of the paper feed roller 4ar causes a paper sheet to be fed from the paper feed unit 4a. FIG. 2 shows an example in which one paper feed unit 4a is provided. A configuration may also be adopted in which a plurality of paper feed units 4a are provided.

The paper sheet conveyance unit 4 conveys a paper sheet. In FIG. 2, a paper sheet conveyance path is shown by a bold line. The paper sheet conveyance unit 4 includes, in order from an upstream side in a paper sheet conveyance direction, a first conveyance portion 41, a registration roller pair 6 (corresponding to a first rotor), a belt conveyance unit 7, and a second conveyance portion 42.

The first conveyance portion 41 conveys a paper sheet from the paper feed unit 4a to the registration roller pair 6. A plurality of first conveyance roller pairs 41a are provided in the first conveyance portion 41. There is provided a first conveyance motor 41b for causing the first conveyance roller pairs 41a to rotate. At the time of printing, the control unit 1 controls the first conveyance motor 41b to rotate. Then, the first conveyance roller pairs 41a are caused to rotate. Thus, a paper sheet fed from the paper feed unit 4a is conveyed to the registration roller pair 6.

The registration roller pair 6 has been stopped from rotating at the time of arrival of a paper sheet. While the registration roller pair 6 remains stopped from rotating, the first conveyance roller pair 41a continues to convey the paper sheet. A tip end of the paper sheet strikes against a nip of the registration roller pair 6, so that a flexure is formed in the paper sheet. Formation of such a flexure causes the tip end of the paper sheet to be aligned with the nip of the registration roller pair 6. Thus, skew feeding of the paper sheet is corrected.

There is provided a paper sheet sensor 10 for detecting arrival of a paper sheet at the registration roller pair 6. The paper sheet sensor 10 is provided on an upstream side of the registration roller pair 6 in the conveyance direction. The paper sheet sensor 10 is provided in a vicinity of the registration roller pair 6. An output of the paper sheet sensor 10 is inputted to the control unit 1. The control unit 1 then recognizes arrival of a tip end of a paper sheet at the registration roller pair 6 (the paper sheet sensor 10).

The printer 100 includes a first motor 6a. The first motor 6a causes the registration roller pair 6 to rotate. When a preset waiting time has elapsed since recognition of arrival of a tip end of a paper sheet at the paper sheet sensor 10, the control unit 1 controls the first motor 6a to start rotating. This causes the registration roller pair 6 to feed out a paper sheet (secondary paper feeding). The registration roller pair 6 feeds the paper sheet toward the belt conveyance unit 7.

The belt conveyance unit 7 includes a conveyance belt 70 (corresponding to a second rotor), a drive roller 71, and a plurality of driven rollers 72. The conveyance belt 70 is wound on the drive roller 71 and the driven rollers 72. The conveyance belt 70 has an endless shape. The paper sheet conveyance unit 4 includes a second motor 7a that causes the drive roller 71 to rotate. At the time of printing, the control unit 1 controls the second motor 7a to rotate. This causes the drive roller 71 to rotate. As the drive roller 71 rotates, the driven rollers 72 rotate. Furthermore, the conveyance belt 70 also moves circularly. As a result, a paper sheet placed on the conveyance belt 70 is conveyed toward the image forming unit 5 and the second conveyance portion 42. The belt conveyance unit 7 also includes an absorption mechanism (not shown). The absorption mechanism causes a paper sheet to be absorbed on the conveyance belt 70.

A paper sheet conveyed by the belt conveyance unit 7 enters the second conveyance portion 42. The second conveyance portion 42 links an end portion of an upper surface of the conveyance belt 70 on a downstream side in the paper sheet conveyance direction to a paper sheet discharge port. A plurality of second conveyance roller pairs 42a are provided in the second conveyance portion 42. There is provided a second conveyance motor 42b for causing the second conveyance roller pairs 42a to rotate. At the time of printing, the control unit 1 controls the second conveyance motor 42b to rotate. The second conveyance roller pairs 42a then rotate. Thus, a paper sheet that has passed through the image forming unit 5 is discharged to outside the printer 100.

The image forming unit 5 is provided above the conveyance belt 70. The image forming unit 5 faces the upper surface of the conveyance belt 70 on an outer side. The image forming unit 5 ejects an ink onto a paper sheet being conveyed on the conveyance belt 70. The image forming unit 5 records (prints) an image on a paper sheet. As shown in FIG. 1 and FIG. 2, the image forming unit 5 includes a plurality of line heads 50. The printer 100 includes four line heads 50 (50Bk, 50C, 50M, 50Y). The line heads 50 are securely provided. The line heads 50 are provided above the conveyance belt 70. A given gap is provided between the line heads 50 and the conveyance belt 70. The line head 50Bk ejects a black ink. The line head 50C ejects a cyan ink. The line head 50M ejects a magenta ink. The line head 50Y ejects a yellow ink.

With respect to the line heads 50, ink tanks 51 (51Bk, 51C, 51M, 51Y) are provided, respectively. The ink tank 51Bk supplies a black ink to the line head 50Bk. The ink tank 51C supplies a cyan ink to the line head 50C. The ink tank 51M supplies a magenta ink to the line head 50M. The ink tank 51Y supplies a yellow ink to the line head 50Y.

Each of the line heads 50 includes a plurality of nozzles. The nozzles are arranged in a main scanning direction (a direction orthogonal to the paper sheet conveyance direction, a direction perpendicular to a plane of FIG. 2). Respective openings of the nozzles face the conveyance belt 70. Based on image data, the control unit 1 performs control so that an ink is ejected from each of the nozzles toward pixels as a target of ink ejection. The ink impacts on a paper sheet being conveyed. Thus, an image is formed (recorded) thereon. An interval between the nozzles in the main scanning direction corresponds to a pitch of a single pixel (a single dot, a single line).

The printer 100 also includes a reading unit 8. The reading unit 8 reads a paper sheet while the paper sheet is being conveyed. The reading unit 8 is provided on the conveyance path. The reading unit 8 is provided between the registration roller pair 6 and the belt conveyance unit 7.

Furthermore, the control unit 1 is connected to a communication unit 13. The communication unit 13 includes communication hardware (a connector, a communication circuit) and software. The communication unit 13 communicates with a computer 200. The computer 200 is, for example, a personal computer or a server. The control unit 1 receives printing data from the computer 200. The printing data includes settings for printing and contents to be printed. For example, the printing data includes data described in a page description language. The control unit 1 (the image processing portion 12) analyzes the printing data received (inputted). Based on a result of the analysis, the control unit 1 generates image data (raster data) to be used for image formation in the image forming unit 5.

(Paper Sheet Conveyance Unit 4 and Reading Unit 8)

Figure 3:
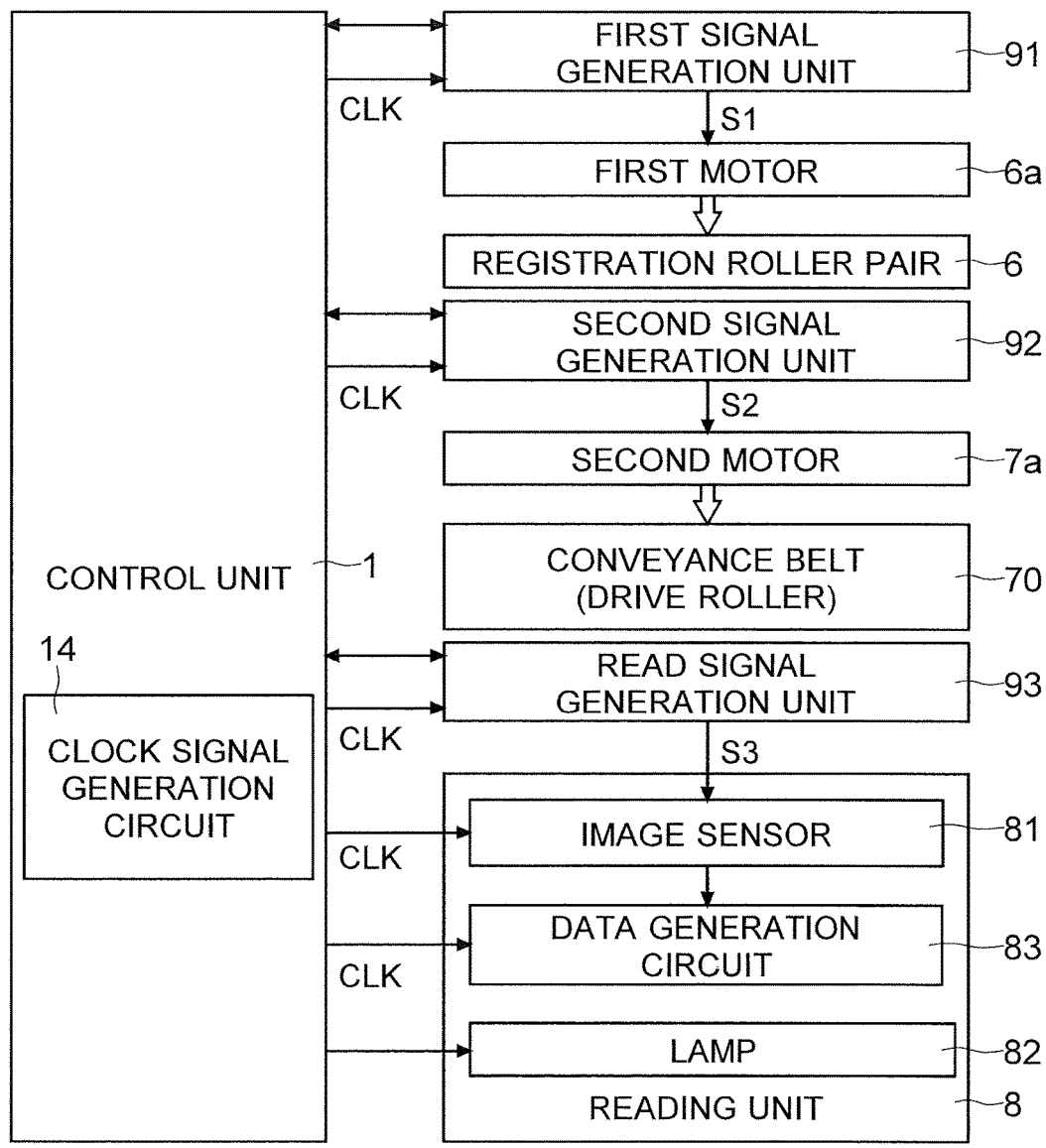
FIG. 3 is a diagram showing one example of a paper sheet conveyance unit and a reading unit according to the embodiment.

Next, with reference to FIG. 3, a description is given of one example of the paper sheet conveyance unit 4 and the reading unit 8 of the printer 100 according to the embodiment. The first motor 6a causes the registration roller pair 6 to rotate. The first motor 6a is, for example, a stepping motor (a pulse motor). A first drive signal S1 is inputted to the first motor 6a. The first drive signal S1 is a pulse signal. The first motor 6a rotates at a speed depending on a frequency (a cycle) of the first drive signal S1. For example, at every rising edge of the first drive signal S1, the first motor 6a rotates by a prescribed angle. The printer 100 includes a first signal generation unit 91. The first signal generation unit 91 generates the first drive signal S1.

The second motor 7a causes the conveyance belt 70 (the drive roller 71) to rotate. The conveyance belt 70 (the belt conveyance unit 7) is provided on a downstream side of the registration roller pair 6 in the paper sheet conveyance direction. The second motor 7a is also, for example, a stepping motor (a pulse motor). A second drive signal S2 is inputted to the second motor 7a. The second drive signal S2 is a pulse signal. The second motor 7a rotates at a speed depending on a frequency (a cycle) of the second drive signal S2. For example, at every rising edge of the second drive signal S2, the second motor 7a rotates by a prescribed angle. The printer 100 includes a second signal generation unit 92. The second signal generation unit 92 generates the second drive signal S2.

The reading unit 8 includes an image sensor 81 and a lamp 82. The reading unit 8 is a CIS-type device. The image sensor 81 is, for example, a line sensor. When reading a paper sheet, the control unit 1 controls the lamp 82 to light up. The lamp 82 emits light toward a position where the paper sheet passes. The light from the lamp 82 is reflected off the paper sheet or a conveyance guide. The image sensor 81 includes a plurality of light-receiving elements. The light-receiving elements are arranged in a row along the main scanning direction. The main scanning direction is a direction perpendicular to the paper sheet conveyance direction. A lens is provided between a destination of light irradiation by the lamp 82 and the image sensor 81. The light reflected off the paper sheet or the guide and collected by the lens becomes incident on the light-emitting elements. Each of the light-emitting elements then outputs a current (a voltage) depending on an amount of light received.

The reading unit 8 includes a data generation circuit 83. The image sensor 81 includes an electric charge transfer circuit. The electric charge transfer circuit transfers an output of each of the light-receiving elements (an analog image signal, a current) to the data generation circuit 83. An analog image signal is inputted to the data generation circuit 83. The data generation circuit 83 includes an ND conversion circuit. The data generation circuit 83 converts an analog image signal outputted from each of the light-receiving elements into a digital value. The data generation circuit 83 then generates image data.

There is provided a read signal generation unit 93 that generates a read signal S3. The read signal S3 is supplied to the image sensor 81. The read signal S3 is a synchronization signal for the image sensor 81. The read signal S3 is a signal on the basis of which each line is read (a horizontal synchronization signal). On the basis of a rising edge (or a falling edge) of the read signal S3, the image sensor 81 starts to transfer an analog image signal from each of the light-receiving elements in order from a leading one of the arranged light-receiving elements.

Furthermore, the control unit 1 includes a clock signal generation circuit 14. The clock signal generation circuit 14 generates a clock signal CLK. The clock signal generation circuit 14 generates one or a plurality of types of clock signals CLK. The clock signal CLK is inputted to the first signal generation unit 91, the second signal generation unit 92, and the image sensor 81. Based on the clock signal CLK, the first signal generation unit 91 generates the first drive signal S1. Based on the clock signal CLK, the second signal generation unit 92 generates the second drive signal S2.

For example, the first signal generation unit 91 counts the clock signal CLK. Upon a count value reaching a preset value, the first signal generation unit 91 causes the first drive signal S1 to change in level (high level, low level). Furthermore, the second signal generation unit 92 counts the clock signal CLK. Upon a count value reaching a preset value, the second signal generation unit 92 causes the second drive signal S2 to change in level (high level, low level). Furthermore, for example, by using the clock signal CLK, the image sensor 81 transfers electric charge (an analog image signal). Separately from the clock signal generation circuit 14, there may be provided one or a plurality of circuits that each generates the clock signal CLK. The clock signal CLK may be inputted from a separately provided circuit to either or both of the first signal generation unit 91 and the second signal generation unit 92.

(Control of Rotation of Registration Roller Pair 6 and Conveyance Belt 70)

Figure 4:
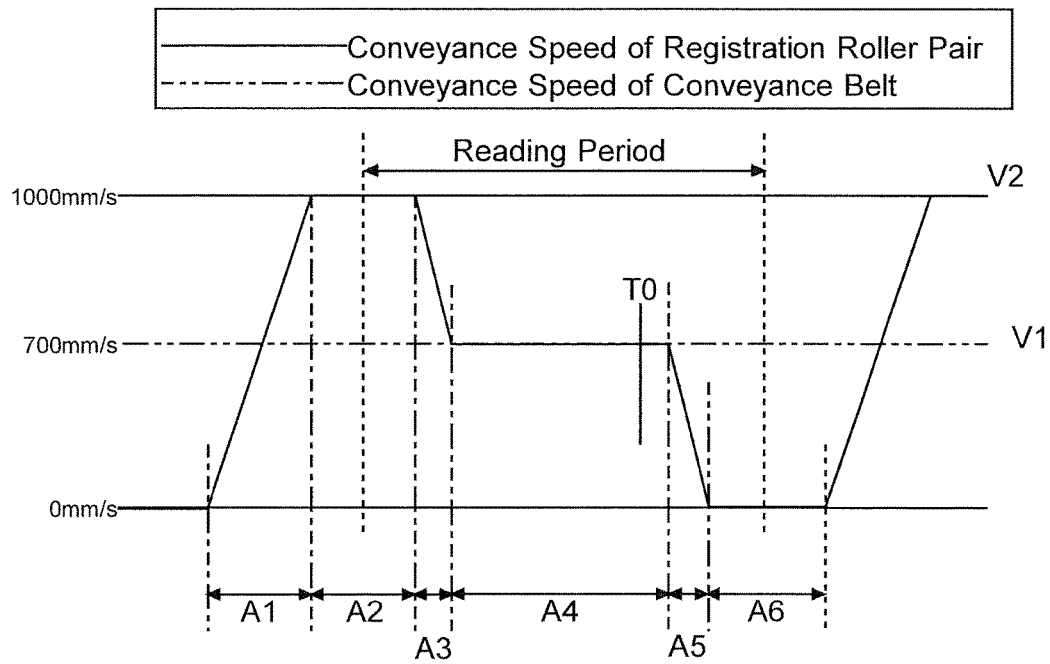
FIG. 4 is a diagram showing one example of control of a first motor and a second motor according to the embodiment.

Next, with reference to FIG. 4, a description is given of one example of control of rotation of the registration roller pair 6 and the conveyance belt 70 according to the embodiment. At the time of printing, the control unit 1 controls the registration roller pair 6 and the belt conveyance unit 7 to convey a paper sheet. The control unit 1 controls the second motor 7a and the second signal generation unit 92. First, the control unit 1 controls the conveyance belt 70 to move circularly so that a paper sheet is conveyed at a reference speed V1. In other words, the control unit 1 sets a circumferential speed of the conveyance belt 70 to the reference speed V1. The control unit 1 controls the second signal generation unit 92 to generate the second drive signal S2 so that the second drive signal S2 has such a frequency that a paper sheet conveyance speed of the conveyance belt 70 becomes the reference speed V1. At the time of printing, the second signal generation unit 92 causes the conveyance belt 70 to rotate at a constant speed. FIG. 4 shows an example in which the reference speed V1 is set to 700 mm/s. The reference speed V1 is preset. The reference speed V1 is set taking into consideration a reading limit or the number of sheets printed per unit time pursuant to the specifications. The reference speed V1 varies depending on a type of the image forming apparatus.

Next, a description is given of a paper sheet conveyance speed of the registration roller pair 6. The control unit 1 controls the first motor 6a and the first signal generation unit 91. At a time point when a paper sheet has arrived at the registration roller pair 6, the control unit 1 maintains the first motor 6a in a stopped state. In stopping the first motor 6a, the first signal generation unit 91 sets a frequency of the first drive signal S1 to zero. When a waiting time has elapsed after detection of arrival of a tip end of a paper sheet by the paper sheet sensor 10, the control unit 1 controls the registration roller pair 6 to rotate. Before a succeeding paper sheet arrives at the registration roller pair 6, the control unit 1 stops the registration roller pair 6 from rotating.

A time period from a start of rotation of the registration roller pair 6 until a next start of rotation of the registration roller pair 6 includes an acceleration period A1, a first constant speed period A2, a primary deceleration period A3, a second constant speed period A4, a secondary deceleration period A5, and a stop period A6.

The acceleration period A1 is a time period from after a start of rotation of the first motor 6a until an end of acceleration. When a waiting time has elapsed after detection of arrival of a tip end of a paper sheet by the paper sheet sensor 10, the control unit 1 inputs a rotation start command to the first signal generation unit 91. Based on the rotation start command, the first signal generation unit 91 causes the first motor 6a to start rotation. In the acceleration period A1, the first signal generation unit 91 accelerates a rotational speed of the first motor 6a. The first signal generation unit 91 increases a frequency of the first drive signal S1 to a maximum frequency. The maximum frequency is such a frequency that the paper sheet conveyance speed of the registration roller pair 6 becomes a preset upper limit speed V2. The upper limit speed V2 is faster than the reference speed V1. In an example shown in FIG. 4, the upper limit speed V2 is 1000 mm/s.

In order to increase productivity (the number of sheets printed per unit time), at a start of conveyance, the conveyance speed of the registration roller pair 6 is set to be higher than the reference speed V1. Thus, while a paper sheet is being conveyed, an inter-sheet spacing between the paper sheet and a succeeding paper sheet can be increased. Before a succeeding paper sheet arrives at the registration roller pair 6, an inter-sheet spacing can be increased. Since a sheet feed interval can be reduced as much as possible, productivity can be increased. The control unit 1 controls the paper feed unit 4a and the first conveyance portion 41 to convey a paper sheet at a speed less than the upper limit speed V2.

The first constant speed period A2 is a time period from a time when a frequency of the first drive signal S1 has become the maximum frequency until a start of primary deceleration of the registration roller pair 6. Upon a frequency of the first drive signal S1 reaching the maximum frequency, until a command is issued from the control unit 1, the first signal generation unit 91 maintains the first drive signal S1 at the maximum frequency. The first constant speed period A2 is a time period in which the first drive signal S1 is maintained at the maximum frequency.

The primary deceleration period A3 is a time period in which a frequency of the first drive signal S2 is decreased from the maximum frequency to a reference frequency. The control unit 1 inputs, to the first signal generation unit 91, a primary deceleration command to decelerate the first motor 6a. When a preset primary deceleration starting time has elapsed after a start of rotation of the registration roller pair 6 (after a start of rotation of the first motor 6a), the control unit 1 inputs the primary deceleration command to the first signal generation unit 91. For example, an average time required for a tip end of a paper sheet to arrive at the conveyance belt 70 may be used as the primary deceleration starting time. For example, a time obtained by dividing a distance from the registration roller pair 6 to the conveyance belt 70 by an average conveyance speed of the registration roller pair 6 may be used as the average time required.

Based on the primary deceleration command, the first signal generation unit 91 decelerates a rotational speed of the first motor 6a. The first signal generation unit 91 decreases a frequency of the first drive signal S1 from the maximum frequency to the reference frequency. The first signal generation unit 91 decreases the frequency in a gradual manner. The reference frequency is such a frequency that the paper sheet conveyance speed of the registration roller pair 6 becomes the reference speed V1. In the example shown in FIG. 4, the reference speed V1 is 700 mm/s.

The second constant speed period A4 is a time period from a time when a frequency of the first drive signal S1 has become the reference frequency until a start of secondary deceleration of the registration roller pair 6. Upon a frequency of the first drive signal S1 reaching the reference frequency, until a command is issued from the control unit 1, the first signal generation unit 91 maintains the first drive signal S1 at the reference frequency. The second constant speed period A4 is a time period in which the first drive signal S1 is maintained at the reference frequency. A tip end of a paper sheet arrives at the conveyance belt 70 from a starting time point of the second constant speed period A4 or at some point in the second constant speed period A4. In the second constant speed period A4, both of the registration roller pair 6 and the conveyance belt 70 convey a paper sheet.

The secondary deceleration period A5 is a time period in which a frequency of the first drive signal S1 is decreased from the reference frequency to zero. The control unit 1 inputs a secondary deceleration command to decelerate the first motor 6a to the first signal generation unit 91. When a preset secondary deceleration starting time point is reached, the control unit 1 inputs the secondary deceleration command to the first signal generation unit 91. The control unit 1 recognizes a time point when a rear end of a paper sheet has passed beyond the paper sheet sensor 10. By utilizing this, the control unit 1 may use, as the secondary deceleration starting time point, a time point when a time obtained by dividing a distance between the paper sheet sensor 10 and the nip of the registration roller pair 6 by the reference speed V1 has elapsed since recognition of passing of the rear end. Furthermore, the control unit 1 may use a time point when passing of the rear end is recognized as the secondary deceleration starting time point.

Based on the secondary deceleration command, the first signal generation unit 91 decelerates a rotational speed of the first motor 6a. The first signal generation unit 91 decreases a frequency of the first drive signal S1 from the reference frequency to zero. The first signal generation unit 91 decreases the frequency in a gradual manner. Thus, the first motor 6a (the registration roller pair 6) is stopped.

The stop period A6 is a time period from after the registration roller pair 6 has been completely stopped until a next start of rotation thereof. After a frequency of the first drive signal S1 has reached zero, until the rotation start command is issued from the control unit 1, the first signal generation unit 91 maintains the first drive signal S1 unchanged.

The reading unit 8 is provided downstream of the registration roller pair 6. A paper sheet fed out by the registration roller pair 6 travels toward the reading unit 8. The reading unit 8 reads the paper sheet as the paper sheet passes therethrough. As shown in FIG. 4, a reading period in which a paper sheet is read by the reading unit 8 occurs from some point in the first constant speed period A2 to some point in the stop period A6. In other words, the reading period starts from a time when the first signal generation unit 91 is generating the first drive signal S1 at the maximum frequency. The reading period is set to end at a time point between a time when the first motor 6a is stopped and a next start of rotation of the first motor 6a.

(Generation of Read Signal S3)

Figure 5:
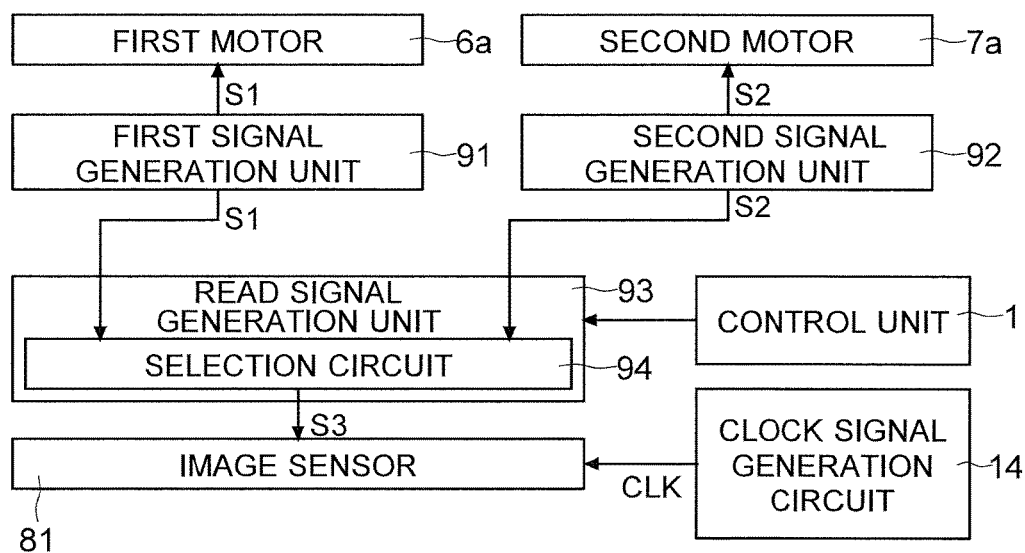
FIG. 5 is a diagram showing one example of generation of a read signal in the printer according to the embodiment.
Figure 6:
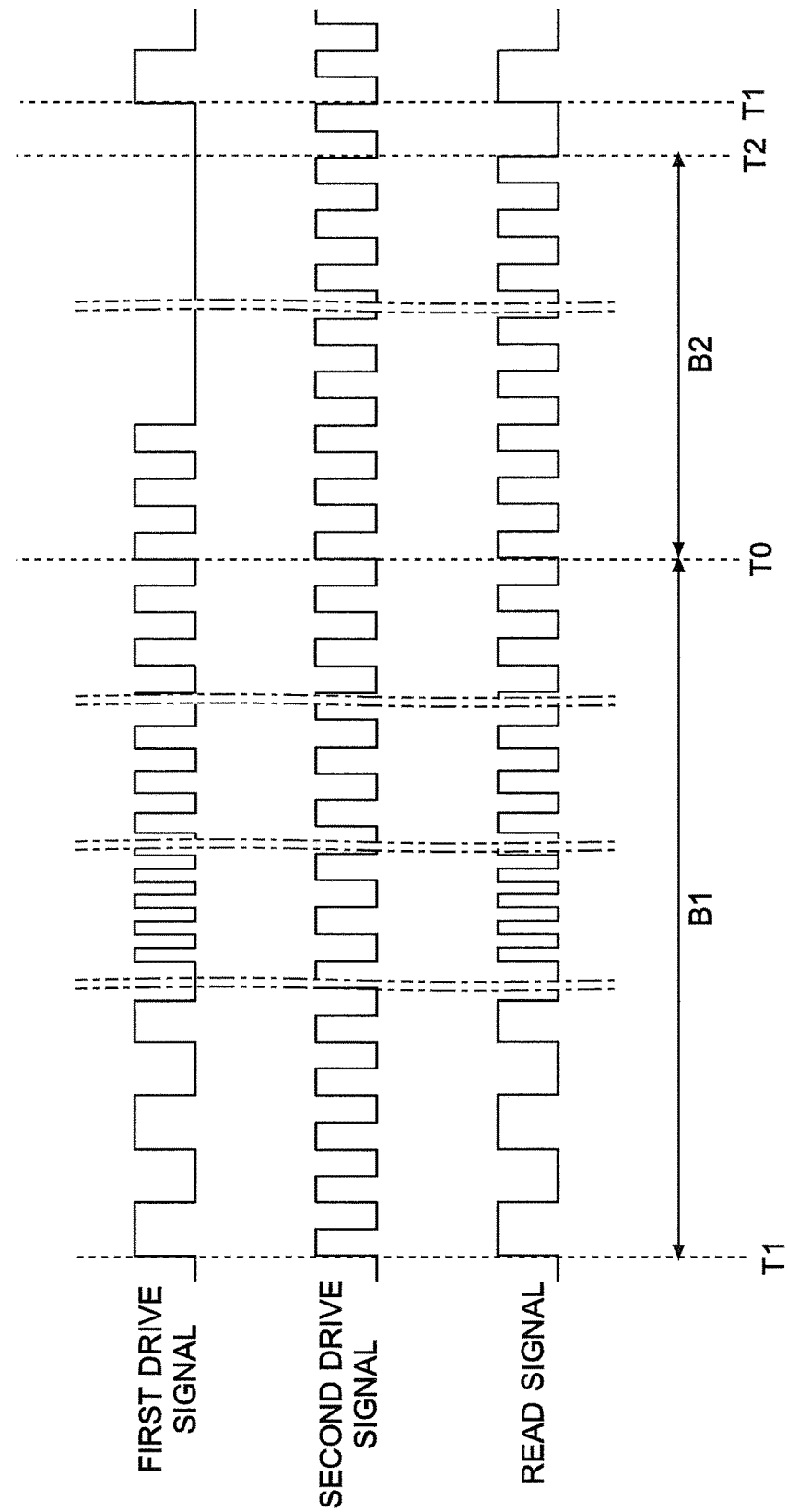
FIG. 6 is a diagram showing one example of a timing chart of a first drive signal, a second drive signal, and the read signal according to the embodiment.

Next, with reference to FIG. 5 and FIG. 6, a description is given of one example of generation of the read signal S3 in the printer 100 according to the embodiment. A paper sheet being conveyed can be read by the reading unit 8. Based on image data obtained through the reading, the control unit 1 performs printing adjustment processing. For example, the paper sheet may become positionally misaligned in the main scanning direction. In such a case time, based on the image data, the control unit 1 determines a misalignment direction and a misalignment amount. The control unit 1 then shifts positions of pixels of the image data used for printing in a direction reverse to the misalignment direction. The control unit 1 shifts the positions of the pixels of the image data used for printing by the misalignment amount thus determined. For example, when the paper sheet is misaligned by 1 mm, the control unit 1 shifts the image data used for printing by 1 mm in the main scanning direction. The control unit 1 processes the image data used for printing. Thus, even when a paper sheet is positionally misaligned, ink can be ejected to an appropriate position.

Furthermore, there may be a case where a paper sheet being conveyed is bent or has a hole. Ink ejected to such a bent or holed portion of the paper sheet smears the conveyance belt 70. The ink that has thus adhered to the conveyance belt 70 may smear a succeeding paper sheet. To avoid this, based on image data, the control unit 1 recognizes a bent or holed portion of a paper sheet. Then, the control unit 1 masks those ones of pixels of the image data used for printing that correspond to the bent or holed portion. Masking is a treatment for preventing ink from being ejected to masked pixels.

Image data obtained through reading by the reading unit 8 is used for printing adjustment. In order to appropriately perform printing adjustment, preferably, a resolution of image data is maintained constant. In order to maintain a constant resolution, it is required to prevent fluctuations in reading width per line (a width of a single line on a paper sheet). As a solution to this, it is conceivable to set a reading cycle per line based on a pulse signal for causing a paper sheet conveyance motor to rotate. The reading cycle per line thus can be changed in accordance with acceleration/deceleration of the motor. This can reduce fluctuations in reading width per line.

Here, the reading unit 8 is provided between the registration roller pair 6 and the conveyance belt 70. The reading unit 8 is provided between such rotors whose drive sources are different from each other. Further, between a start of rotation of the registration roller pair 6 and a stop of the rotation, the control unit 1 performs a plurality of times of acceleration and deceleration of the first motor 6a. In order to achieve consistency in resolution, it is required that a frequency of the read signal S3 be changed following fluctuations in rotational speed of the first motor 6a.

Furthermore, in the printer 100, the conveyance belt 70 conveys a paper sheet that has passed through the reading unit 8. Upon the paper sheet arriving at the conveyance belt 70, the control unit 1 causes the first motor 6a to rotate so that the conveyance speed becomes the reference speed V1 (the second constant speed period A4). Thereafter, the paper sheet is conveyed at the reference speed V1. In order to achieve consistency in resolution, it is also required that a frequency of the read signal S3 be set to a frequency corresponding to the reference speed V1. Meanwhile, in the reading period, the first motor 6a is decelerated and stopped. Because of this, when the reading cycle per line is set based only on either the first drive signal S1 or the second drive signal S2, the reading width per line cannot be maintained constant. As a solution to this, in the printer 100, the read signal S3 is generated so that consistency in resolution of image data is achieved even when the reading unit 8 is provided between rotors whose drive sources are different from each other.

Specifically, a switching time point T0 is provided within a time period from a start of rotation of the registration roller pair 6 until a stop of the rotation (see FIG. 4). In a first period B1 from after the start of rotation of the registration roller pair 6 until the switching time point T0, the read signal generation unit 93 generates the read signal S3 so that, in accordance with a frequency of the first drive signal S1, every line of a paper sheet is read upon conveyance thereof. In a second period B2 from the switching time point until a rear end of the paper sheet passes through the image sensor 81, the read signal generation unit 93 generates the read signal S3 so that every line of the paper sheet being conveyed at the reference speed V1 is read upon conveyance thereof.

Here, the control unit 1 sets the switching time point T0. The control unit 1 issues a switching command to the read signal generation unit 93. A time point when the switching command is issued is set as the switching time point T0. The switching time point T0 is set to any time point within the second constant speed period A4. In other words, the control unit 1 sets, as the switching time point T0, a time point between a time of issuance of the primary deceleration command and a time of issuance of the secondary deceleration command. Furthermore, the control unit 1 sets, as the switching time point T0, a time point when or after the conveyance belt 70 has started to convey a paper sheet. In other words, the switching time point T0 is set to a time point when or after a tip end of a paper sheet being conveyed by the registration roller pair 6 has arrived at the conveyance belt 70. Furthermore, the switching point T0 is provided within a time period in which the first drive signal S1 has the reference frequency. That is, the switching time point T0 is provided within a time period in which the paper sheet conveyance speed of the registration roller pair 6 agrees with that of the conveyance belt 70.

For example, the control unit 1 may set, as the switching time point T0, a time point when a preset switching setting time has elapsed since a start of rotation of the registration roller pair 6. As the switching setting time, a time obtained by dividing a distance from the registration roller pair 6 to the conveyance belt 70 by an average conveyance speed of the registration roller pair 6 may be used. At a time point when the switching setting time has elapsed since issuance of the rotation start command, the control unit 1 provides the read signal generation unit 93 with notification of the switching command.

Here, as shown in FIG. 4, with respect to a first half and a latter half of the second constant speed period A4, the control unit 1 may set a time point within the latter half as the switching time point T0. A cycle of the read signal S3 can be switched at a time point when a stable paper sheet conveyance speed is established. The switching time point T0 may be set to a time point immediately before the second constant speed period A4 ends or a time point when the second constant speed period A4 has just ended. For example, the switching time point T0 may be set to a time point when passing of a rear end of a paper sheet is recognized by the paper sheet sensor 10. In this case, at the time point when passing of a rear end of a paper sheet is recognized by the paper sheet sensor 10, the control unit 1 provides the read signal generation unit 93 with notification of the switching command.

With reference to FIG. 5 and FIG. 6, a description is given of generation of the read signal S3 in the printer 100 according to the embodiment. FIG. 5 and FIG. 6 are used to describe a case where the first motor 6*a* causes the registration roller pair 6 to rotate so that every line of a paper sheet is conveyed per pulse of the first drive signal S1. Furthermore, an example is described where the second motor 7*a* causes the conveyance belt 70 to rotate so that every line of a paper sheet is conveyed per pulse of the second drive signal S2.

First, as shown in FIG. 5, the read signal generation unit 93 is connected to the first signal generation unit 91 and the second signal generation unit 92 via a signal line. The first signal generation unit 91 inputs the first drive signal S1 to the read signal generation unit 93. The second signal generation unit 92 inputs the second drive signal S2 to the reading signal generation portion 93.

Further, in the first period B1, the read signal generation unit 93 generates the read signal S3 so that the read signal S3 is synchronized with the first drive signal S1. In the second period B2, the read signal generation unit 93 generates the read signal S3 so that the read signal S3 is synchronized with the second drive signal S2. Specifically, the read signal generation unit 93 includes a selection circuit 94. The first drive signal S1 and the second drive signal S2 are inputted to the selection circuit 94. The selection circuit 94 outputs either the first drive signal S1 or the second drive signal S2. Upon receipt of the switching command from the control unit 1, the read signal generation unit 93 (the selection circuit 94) switches a signal to be outputted therefrom. An output of the selection circuit 94 is inputted as the read signal S3 to the image sensor 81.

With reference to FIG. 6, a description is given of switching timing for switching a frequency (a cycle) of the read signal S3. As shown in FIG. 6, the second signal generation unit 92 generates the second drive signal S2 so that the second drive signal S2 has a constant frequency. A frequency of the second drive signal S2 is a frequency at which the conveyance belt 70 conveys a paper sheet at the reference speed V1. The conveyance belt 70 rotates at a constant speed.

In FIG. 6, a time point T1 is a time point when rotation of the registration roller pair 6 is started. The control unit 1 issues the switching command at the switching time point T0. Meanwhile, from the time point T1 to the switching time point T0, a rotational speed of the first motor 6*a* changes. In accordance with a change in conveyance speed, the first signal generation unit 91 causes the first drive signal S1 to change in frequency (cycle).

As shown in FIG. 6, in the first period B1, a waveform of the first drive signal S1 agrees with that of the read signal S3. Consequently, during the first period B1, in accordance with a change in speed of the first motor 6*a*, the reading width per line can be maintained constant. On the other hand, in the second period B2, a waveform of the second drive signal S2 agrees with that of the reading signal S3. In the second period B2, the read signal generation unit 93 operates so as to correspond to paper sheet conveyance at the reference speed V1 by the conveyance belt 70 and the registration roller pair 6. Also in the second period B2, the reading width per line can be maintained constant.

A time point T2 is a time point when a rear end of a paper sheet has passed beyond the image sensor 81. The control unit 1 determines a time point when a rear end of a paper sheet has passed through the image sensor 81. A configuration may be adopted in which, based on image data obtained through reading by the image sensor 81, the control unit 1 determines a time point when a rear end of a paper sheet has passed through the image sensor 81. Furthermore, the control unit 1 may determine, as said time point, a time point when a preset expected time at which a rear end of a paper sheet is expected to pass through the image sensor 81 has elapsed since detection, by the paper sheet sensor 10, of passing of the rear end of the paper sheet.

Upon determining that a rear end of a paper sheet has passed through the image sensor 81, the control unit 1 inputs a re-switching command to the read signal generation unit 93. Upon receipt of the re-switching command, the read signal generation unit 93 selects the first drive signal S1. The read signal generation unit 93 prepares for a next start of paper sheet conveyance. Concurrently with a next start of rotation of the registration roller pair 6, the read signal generation unit 93 outputs, as the read signal S3, a signal synchronized with the first drive signal S1.

First Modification Example

Figure 7:
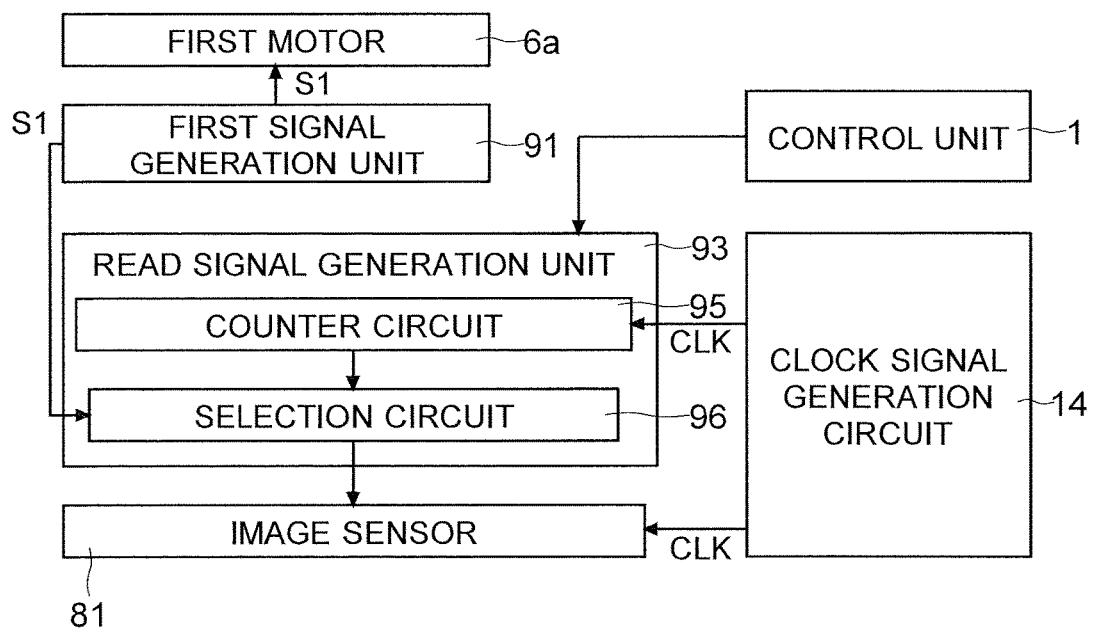
FIG. 7 is a diagram showing one example of generation of a read signal according to a first modification example.
Figure 8:
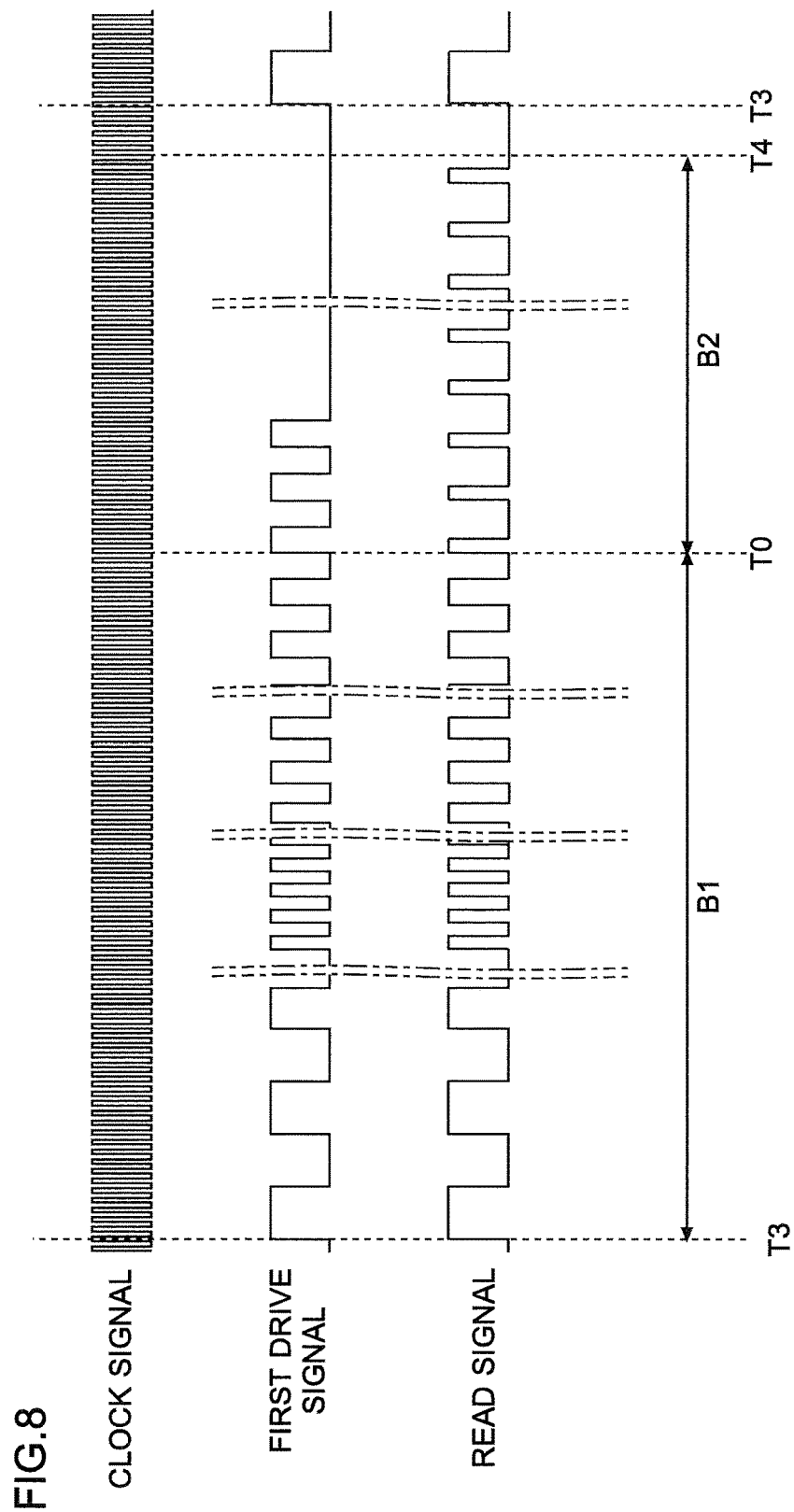
FIG. 8 is a diagram showing one example of a timing chart of a first drive signal and the read signal according to the first modification example.

Next, with reference to FIG. 7 and FIG. 8, a description is given of a first modification example of generation of the read signal S3. Also in the first modification example, a switching time point T0 is provided within a time period from a start of rotation of the registration roller pair 6 until a stop of the rotation. The switching time point T0 could be similar to the switching time point T0 in the foregoing embodiment. Furthermore, FIG. 7 and FIG. 8 are also used to describe a case where the first motor 6a causes the registration roller pair 6 to rotate so that every line of a paper sheet is conveyed per pulse of the first drive signal S1. Furthermore, an example is described where the second motor 7a causes the conveyance belt 70 to rotate so that every line of a paper sheet is conveyed per pulse of the second drive signal S2.

First, as shown in FIG. 7, the read signal generation unit 93 is connected to the first signal generation unit 91 and the clock signal generation circuit 14 via a signal line. The read signal generation unit 93 is not connected to the second signal generation unit 92. The first signal generation unit 91 inputs the first drive signal S1 to the read signal generation unit 93. The clock signal generation circuit 14 inputs the clock signal CLK to the read signal generation unit 93. The clock signal generation circuit 14 generates the clock signal CLK so that the clock signal CLK has a frequency much higher than the maximum frequency.

Further, in a first period B1, the read signal generation unit 93 generates the read signal S3 so that the read signal S3 is synchronized with the first drive signal S1. In a second period B2, the read signal generation unit 93 counts the clock signal CLK. Further, the read signal generation unit 93 causes the read signal S3 to change so that a frequency of the read signal S3 is equal to the reference frequency. In other words, in the second period B2, the read signal generation unit 93 sets a cycle of the read signal S3 so that it agrees with a cycle of the reference frequency. In order to count the clock signal CLK, the read signal generation unit 93 includes a counter circuit 95. The counter circuit 95 generates and outputs a signal rising at every count of the number of clock signals CLK corresponding to a cycle of the reference frequency.

The read signal generation unit 93 also includes a selection circuit 96. The first drive signal S1 and an output signal of the counter circuit 95 are inputted to the selection circuit 96. The selection circuit 96 outputs either the first drive signal S1 or the output signal of the counter circuit 95. Upon receipt of the switching command from the control unit 1, the read signal generation unit 93 (the selection circuit 96) switches a signal to be outputted therefrom. In the first period B1, the selection circuit 96 outputs the first drive signal S1. In the second period B2, the selection circuit 96 outputs the output signal of the counter circuit 95. An output of the selection circuit 96 is inputted as the reading signal S3 to the image sensor 81.

With reference to FIG. 8, a description is given of switching timing for switching a frequency (a cycle) of the read signal S3. In FIG. 8, a time point T3 is a time point when rotation of the registration roller pair 6 is started. The control unit 1 issues the switching command at the switching time point T0. Meanwhile, from the time point T3 to the switching time point T0, the first motor 6a operates at a varying speed, i.e. an accelerated speed, a constant speed (the upper limit speed V2), a decelerated speed, and a constant speed (the reference speed V1). In accordance with a change in conveyance speed, the first signal generation unit 91 causes the first drive signal S1 to change in frequency (cycle).

As shown in FIG. 8, in the first period B1, a waveform of the first drive signal S1 agrees with that of the read signal S3. Consequently, during the first period B1, in accordance with a change in speed of the first motor 6a, the reading width per line can be maintained constant. On the other hand, in the second period B2, the read signal S3 is generated so that a frequency of the read signal S3 is equal to the reference frequency. In the second period B2, the read signal generation unit 93 sets a cycle of the read signal S3 so that it corresponds to paper sheet conveyance at the reference speed V1. Also in the second period B2, the reading width per line can be maintained constant.

A time point T4 is a time point when a rear end of a paper sheet has passed beyond the image sensor 81. The control unit 1 determines a time point when a rear end of a paper sheet has passed through the image sensor 81. The determination could be performed by a technique similar to that in the foregoing embodiment. Upon determining that a rear end of a paper sheet has passed through the image sensor 81, the control unit 1 inputs the re-switching command to the read signal generation unit 93. Upon receipt of the re-switching command, the read signal generation unit 93 selects the first drive signal S1. The read signal generation unit 93 prepares for a next start of paper sheet conveyance. Concurrently with a next start of rotation of the registration roller pair 6, the read signal generation unit 93 outputs, as the read signal S3, a signal synchronized with the first drive signal S1.

Second Modification Example

Figure 9:
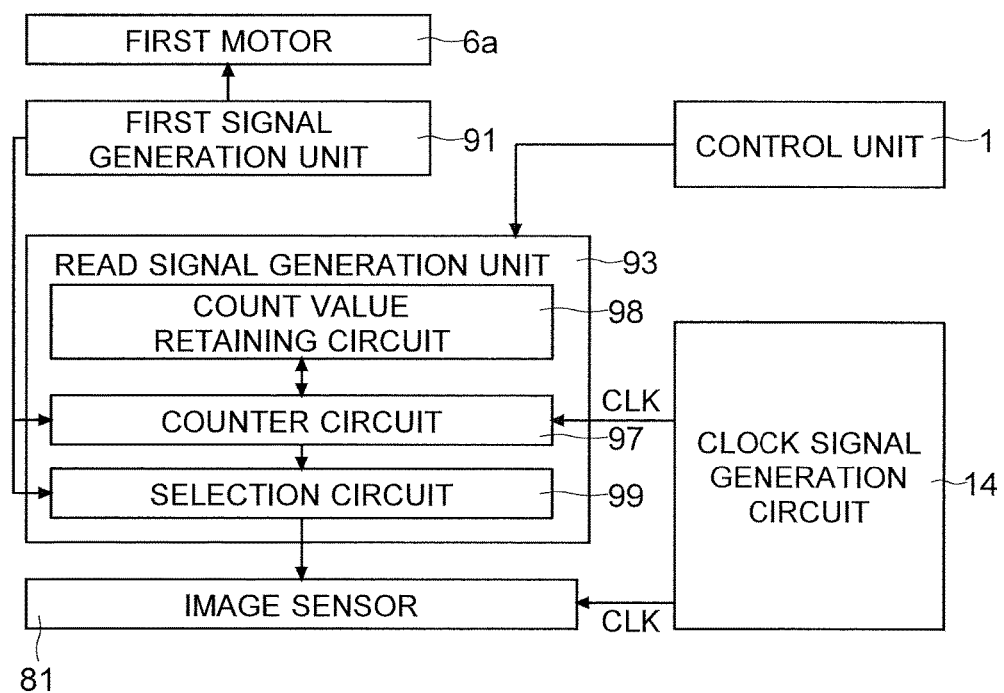
FIG. 9 is a diagram showing one example of generation of a read signal according to a second modification example.

Next, with reference to FIG. 9 and FIG. 10, a description is given of a second modification example of generation of the read signal S3. Also in the second modification example, a switching time point T0 is provided within a time period from a start of rotation of the registration roller pair 6 to a stop of the rotation. The switching time point T0 could be similar to the switching time point T0 in each of the foregoing embodiment and the first modification example. Furthermore, FIG. 9 and FIG. 10 are also used to describe a case where the first motor 6a causes the registration roller pair 6 to rotate so that every line of a paper sheet is conveyed per pulse of the first drive signal S1. Furthermore, an example is described in which the second motor 7a causes the conveyance belt 70 to rotate so that every line of a paper sheet is conveyed per pulse of the second drive signal S2.

As shown in FIG. 9, in the second modification example, the read signal generation unit 93 is connected to the first signal generation unit 91 and the clock signal generation circuit 14 via a signal line. The read signal generation unit 93 is not connected to the second signal generation unit 92. The first signal generation unit 91 inputs the first drive signal S1 to the read signal generation unit 93. The clock signal generation circuit 14 inputs the clock signal CLK to the read signal generation unit 93. The clock signal generation circuit 14 generates the clock signal CLK so that the clock signal CLK has a frequency much higher than the maximum frequency.

Further, in a first period B1, the read signal generation unit 93 generates the read signal S3 so that the read signal S3 is synchronized with the first drive signal S1. During the first period B1, while the first drive signal S1 has the reference frequency, based on the clock signal CLK, the read signal generation unit 93 measures a pulse interval C1 of the first drive signal S1. In a second period B2, the read signal generation unit 93 generates the read signal S3 so that the read signal S3 has a cycle of the pulse interval C1 thus measured. In other words, in the second period B2, the read signal generation unit 93 sets a cycle of the read signal S3 to a time required to convey every line of a paper sheet at the reference speed V1.

In order to count the clock signal CLK, the read signal generation unit 93 includes a counter circuit 97. The first drive signal S1 is inputted to the counter circuit 97. During the first period B1 (before the switching time period T0), the counter circuit 97 counts the number of clock signals CLK corresponding to a cycle of the first drive signal S1. Specifically, the counter circuit 97 counts the number of clocks corresponding to the pulse interval C1 of the first drive signal S1 at the reference frequency. The counter circuit 97 measures, as the pulse interval C1, a time from a rising edge of the first drive signal S1 to a next rising edge thereof. A configuration may be adopted in which, only in the first period B1, the counter circuit 97 measures a cycle of the first drive signal S1.

The read signal generation unit 93 includes a count value retaining circuit 98. The count value retaining circuit 98 is, for example, a memory. The count value retaining circuit 98 retains a count value obtained through counting by the counter circuit 97. The count value retaining circuit 98 stores the number of clock signals CLK corresponding to the pulse interval C1 (a cycle) of the first drive signal S1.

Furthermore, the read signal generation unit 93 includes a selection circuit 99. The first drive signal S1 and an output signal of the counter circuit 97 are inputted to the selection circuit 99. The selection circuit 99 outputs either the first drive signal S1 or the output signal of the counter circuit 97. Upon receipt of the switching command from the control unit 1, the read signal generation unit 93 (the selection circuit 99) switches a signal to be outputted therefrom. In the first period B1, the selection circuit 99 outputs the first drive signal S1. In the second period B2, the selection circuit 99 outputs the output signal of the counter circuit 97. An output of the selection circuit 99 is inputted as the read signal S3 to the image sensor 81.

In the second period B2, the counter circuit 97 generates the read signal S3 so that the read signal S3 has a cycle of the pulse interval C1 measured. Thus, the counter circuit 97 generates and outputs a signal rising at every count of the number of clock signals CLK corresponding to a cycle of the reference frequency. For example, in the second period B2, the counter circuit 97 generates the read signal S3 so that the read signal S3 has a value of the pulse interval C1 equal to a count value obtained at the last count during the first period B1.

With reference to FIG. 10, a description is given of switching timing for switching a frequency (a cycle) of the read signal S3. In FIG. 10, a time point T5 is a time point when rotation of the registration roller pair 6 is started. At the switching time point T0, the control unit 1 issues the switching command. Meanwhile, from the time point T5 to the switching time point T0, the first motor 6a operates at a varying speed, i.e. an accelerated speed, a constant speed (the upper limit speed V2), a decelerated speed, and a constant speed (the reference speed V1). In accordance with a change in conveyance speed, the first signal generation unit 91 causes the first drive signal S1 to change in frequency (cycle).

As shown in FIG. 10, in the first period B1, a waveform of the first drive signal S1 agrees with that of the read signal S3. Consequently, during the first period B1, in accordance with a change in speed of the first motor 6a, the reading width per line can be maintained constant. On the other hand, in the second period B2, the read signal S3 is generated so that a frequency of the read signal S3 is equal to the reference frequency. In the second period B2, the read signal generation unit 93 generates the read signal S3 so that the read signal S3 has a cycle of the pulse interval C1 measured. In the second period B2, the read signal generation unit 93 sets a cycle of the read signal S3 so that it corresponds to paper sheet conveyance at the reference speed V1. Also in the second period B2, the reading width per line can be maintained constant.

A time point T6 is a time point when a rear end of a paper sheet has passed beyond the image sensor 81. The control unit 1 determines a time point when a rear end of a paper sheet has passed through the image sensor 81. The determination could be performed by a technique similar to that in the foregoing embodiment. Upon determining that a rear end of a paper sheet has passed through the image sensor 81, the control unit 1 inputs the re-switching command to the read signal generation unit 93. Upon receipt of the re-switching command, the read signal generation unit 93 selects the first drive signal S1. The read signal generation unit 93 prepares for a next start of paper sheet conveyance. Concurrently with a next start of rotation of the registration roller pair 6, the read signal generation unit 93 outputs, as the read signal S3, a signal synchronized with the first drive signal S1.

As described thus far, the image forming apparatus (the printer 100) according to the embodiment includes the first motor 6a, the first signal generation unit 91, the second motor 7a, the second signal generation unit 92, the reading unit 8, and the read signal generation unit 93. The first motor 6a causes the first rotor (the registration roller pair 6) that conveys a paper sheet to rotate. The first motor 6a rotates at a speed depending on a frequency of the first drive signal S1. The first signal generation unit 91 generates the first drive signal S1. The second motor 7a causes the second rotor (the conveyance belt 70) to rotate. The second rotor is provided downstream beyond the first rotor in the conveyance direction and conveys the paper sheet. The second motor 7a rotates at a speed depending on a frequency of the second drive signal S2. The second signal generation unit 92 generates the second drive signal S2. The reading unit 8 is provided between the first rotor and the second rotor. The reading unit 8 includes the image sensor 81. Based on the read signal S3, the reading unit 8 reads line by line the paper sheet conveyed thereto. The read signal generation unit 93 generates the read signal S3. At a time point when the paper sheet has arrived at the first rotor, the first signal generation unit 91 maintains the first motor 6a in a stopped state. After a start of rotation of the first rotor, the first signal generation unit 91 accelerates a rotational speed of the first motor 6a and subsequently decelerates the rotational speed so that the first drive signal S1 has the reference frequency. After the first drive signal S1 has been set to have the reference frequency, the first signal generation unit 91 stops the first motor 6a before arrival of a succeeding paper sheet at the first rotor. The reference frequency is such a frequency that a paper sheet conveyance speed of the first rotor becomes the reference speed V1. The second signal generation unit 92 generates the second drive signal S2 so that a paper sheet conveyance speed at which the second rotor conveys the paper sheet becomes the reference speed V1. In the first period B1 from after a start of rotation of the first rotor until the preset switching time point T0, the read signal generation unit 93 generates the read signal S3 so that, in accordance with a frequency of the first drive signal S1, every line of the paper sheet is read upon conveyance thereof. In the second period B2 from the switching time point T0 until a rear end of the paper sheet has passed beyond the image sensor 81, the read signal generation unit 93 generates the read signal S3 so that every line of the paper sheet being conveyed at the reference speed V1 is read upon conveyance thereof. The switching time point T0 is provided within a time period in which the second rotor has started to convey the paper sheet and the first drive signal S1 has the reference frequency.

The first motor 6a causes the first rotor that is provided on an upstream side of the reading unit 8 to rotate. The second motor 7a causes the second rotor that is provided on a downstream side of the reading unit 8 to rotate. In the first period B1 (from a start of rotation of the rotor until the switching time point T0), a cycle of the read signal S3 can be set on the basis of the first drive signal S1. During the first period B1, regardless of a rotational speed of the motors, every dot of the paper sheet can be read upon conveyance thereof.

Once the second rotor starts to convey the paper sheet, the paper sheet is conveyed at the reference speed V1. Based on this, the first drive signal S1 is set to have the reference frequency. Thus, there can be provided a time frame in which the paper sheet conveyance speed of each of the first rotor and the second rotor is the reference speed V1. In the second period B2 (a time period in which the conveyance belt 70 performs conveyance), the paper sheet is conveyed at the reference speed V1. Also in the second period B2, a cycle of the read signal S3 can be set so that every line of the paper sheet is read upon conveyance thereof. That is, from a start of reading of the paper sheet until an end thereof, the reading unit 8 reads every line of the paper sheet upon conveyance thereof. Consequently, even when the first motor 6a and the second motor 7a have different acceleration/deceleration patterns from each other, the paper sheet can be read so that a constant resolution is obtained. This can provide image data having a constant resolution.

Furthermore, the first motor 6a causes the first rotor to rotate so that every line of the paper sheet is conveyed per pulse of the first drive signal S1. The second motor 7a causes the second rotor to rotate so that every line of the paper sheet is conveyed per pulse of the second drive signal S2. Thus, the read signal generation unit 93 could generate the read signal S3 so that a cycle of the read signal S3 agrees with that of the first drive signal S1 or the second drive signal S2.

Furthermore, the first drive signal S1 and the second drive signal S2 are inputted to the read signal generation unit 93. In the first period B1, the read signal generation unit 93 outputs the first drive signal S1 as the read signal S3. In the second period B2, the read signal generation unit 93 outputs the second drive signal S2 as the read signal S3. Thus, in the first period B1, the read signal generation unit 93 could output, as the read signal S3, the first drive signal S1 thus inputted thereto. Furthermore, in the second period B2, the read signal generation unit 93 could output, as the read signal S3, the second drive signal S2 thus inputted thereto. The read signal generation unit 93 is only required to perform switching between signals inputted thereto.

The image forming apparatus according to the first modification example includes the clock signal generation circuit 14 that generates the clock signal CLK having a frequency higher than the maximum frequency of the first drive signal S1. The first drive signal S1 and the clock signal CLK are inputted to the read signal generation unit 93. In the first period B1, the read signal generation unit 93 outputs the first drive signal S1 as the read signal S3. In the second period B2, the read signal generation unit 93 counts the clock signal CLK and causes the read signal S3 to change so that a frequency of the read signal S3 is equal to the reference frequency. Thus, in the first period B1, the read signal generation unit 93 could output, as the read signal S3, the first drive signal S1 thus inputted. Furthermore, in the second period B2, the read signal generation unit 93 outputs, as the read signal S3, a signal generated based on a count of the clock signal CLK. This eliminates the need to input the second drive signal S2 to the read signal generation unit 93.

The image forming apparatus according to the second modification example includes the clock signal generation circuit 14 that generates the clock signal CLK having a frequency higher than the maximum frequency of the first drive signal S1. The first drive signal S1 and the clock signal CLK are inputted to the read signal generation unit 93. In the first period B1, the read signal generation unit 93 outputs the first drive signal S1 as the read signal S3. During the first period B1, while the first drive signal S1 has the reference frequency, based on the clock signal CLK, the read signal generation unit 93 measures the pulse interval C1 of the first drive signal S1. In the second period B2, the read signal generation unit 93 generates the read signal S3 so that the read signal S3 has a cycle of the pulse interval C1 thus measured. Thus, in the first period B1, the read signal generation unit 93 could output, as the read signal S3, the first drive signal S1 thus inputted thereto. Furthermore, in the second period B2, the read signal generation unit 93 outputs, as the read signal S3, a signal generated based on the pulse interval C1 thus measured. This eliminates the need to input the second drive signal S2 to the read signal generation unit 93.

Furthermore, when a rear end of the paper sheet has passed beyond the first rotor, the first signal generation unit 91 gradually decreases a frequency of the first drive signal S1 to zero. Thus, the first motor 6a can be stopped immediately after the paper sheet has passed through the first rotor. The first rotor thus can be stopped before arrival of a succeeding paper sheet.

Furthermore, the image forming apparatus includes the paper feed unit 4a and the belt conveyance unit 7. The paper feed unit 4a feeds the paper sheet toward the first rotor. The belt conveyance unit 7 conveys the paper sheet toward the image forming unit 5 that performs printing on the paper sheet. The first rotor is a registration roller. The belt conveyance unit 7 includes the conveyance belt 70 as the second rotor. The paper sheet fed out from the registration roller is placed on the conveyance belt 70. The conveyance belt 70 conveys the paper sheet fed out from the registration roller. From a time when the paper sheet has come in contact with both of the first rotor and the second rotor until the paper sheet has passed beyond the first rotor, the first signal generation unit 91 sets a frequency of the first drive signal S1 to the reference frequency. An acceleration/deceleration pattern of the first motor 6a that causes the registration roller to rotate is different from an acceleration/deceleration pattern of the second motor 7a that causes the conveyance belt 70 to rotate. Even when the motors have different acceleration/deceleration patterns from each other, the paper sheet being conveyed can be read so that a constant resolution is obtained.

While the foregoing has described the embodiment of the present disclosure, the scope of the present disclosure is not limited thereto. The present disclosure can be implemented by adding various modifications thereto without departing from the spirit of the disclosure.

What is claimed is:

1. An image forming apparatus, comprising:
   a first rotor that conveys a paper sheet;
   a first motor that causes the first rotor to rotate and rotates at a speed depending on a frequency of a first drive signal;
   a first signal generation unit that generates the first drive signal;
   a second rotor that is provided downstream beyond the first rotor in a conveyance direction and conveys the paper sheet;
   a second motor that causes the second rotor to rotate and rotates at a speed depending on a frequency of a second drive signal;
   a second signal generation unit that generates the second drive signal;
   a reading unit that is provided between the first rotor and the second rotor, includes an image sensor, and based on a read signal, reads line by line the paper sheet conveyed thereto; and
   a read signal generation unit that generates the read signal, wherein
   at a time point when the paper sheet has arrived at the first rotor, the first signal generation unit maintains the first motor in a stopped state,
   after a start of rotation of the first rotor, the first signal generation unit accelerates a rotational speed of the first motor and subsequently decelerates the rotational speed so that the first drive signal has a reference frequency,
   after the first drive signal has been set to have the reference frequency, the first signal generation unit stops the first motor before arrival of a succeeding paper sheet at the first rotor,
   the reference frequency is such a frequency that a paper sheet conveyance speed of the first rotor becomes a reference speed,
   the second signal generation unit generates the second drive signal so that a paper sheet conveyance speed at which the second rotor conveys the paper sheet becomes the reference speed,
   in a first period from after a start of rotation of the first rotor until a preset switching time point, the read signal generation unit generates the read signal so that, in accordance with a frequency of the first drive signal, every line of the paper sheet is read upon conveyance thereof,
   in a second period from the switching time point until a rear end of the paper sheet has passed beyond the image sensor, the read signal generation unit generates the read signal so that every line of the paper sheet being conveyed at the reference speed is read upon conveyance thereof, and
   the switching time point is provided within a time period in which the second rotor has started to convey the paper sheet and the first drive signal has the reference frequency.

2. The image forming apparatus according to claim 1, wherein
   the first motor causes the first rotor to rotate so that every line of the paper sheet is conveyed per pulse of the first drive signal, and
   the second motor causes the second rotor to rotate so that every line of the paper sheet is conveyed per pulse of the second drive signal.

3. The image forming apparatus according to claim 1, wherein
   the first drive signal and the second drive signal are inputted to the read signal generation unit,
   in the first period, the read signal generation unit outputs the first drive signal as the read signal, and
   in the second period, the read signal generation unit outputs the second drive signal as the read signal.

4. The image forming apparatus according to claim 1, further comprising:
   a clock signal generation circuit that generates a clock signal having a frequency higher than a maximum frequency of the first drive signal,
   wherein the first drive signal and the clock signal are inputted to the read signal generation unit,
   in the first period, the read signal generation unit outputs the first drive signal as the read signal, and
   in the second period, the read signal generation unit counts the clock signal and causes the read signal to change so that a frequency of the read signal is equal to the reference frequency.

5. The image forming apparatus according to claim 1, further comprising:
   a clock signal generation circuit that generates a clock signal having a frequency higher than a maximum frequency of the first drive signal,
   wherein the first drive signal and the clock signal are inputted to the read signal generation unit,
   in the first period, the read signal generation unit outputs the first drive signal as the read signal, and
   during the first period, while the first drive signal has the reference frequency, based on the clock signal, the read signal generation unit measures a pulse interval of the first drive signal, and
   in the second period, the read signal generation unit generates the read signal so that the read signal has a cycle of the pulse interval thus measured.

6. The image forming apparatus according to claim 1, wherein
   when a rear end of the paper sheet has passed beyond the first rotor, the first signal generation unit gradually decreases a frequency of the first drive signal to zero.

7. The image forming apparatus according to claim 1, further comprising:
   a paper feed unit that feeds the paper sheet toward the first rotor; and
   a belt conveyance unit that conveys the paper sheet toward an image forming unit that performs printing on the paper sheet,
   wherein the first rotor is a registration roller,
   the belt conveyance unit includes a conveyance belt as the second rotor, the paper sheet fed out from the registration roller is placed on the conveyance belt, the conveyance belt conveys the paper sheet fed out from the registration roller, and from a time when the paper sheet has come in contact with both of the first rotor and the second rotor until the paper sheet has passed beyond the first rotor, the first signal generation unit sets a frequency of the first drive signal to the reference frequency.

8. The image forming apparatus according to claim 1, further comprising a control unit, wherein the control unit determines a time point when a rear end of the paper sheet has passed through the image sensor, upon determining that a rear end of the paper sheet has passed through the image sensor, the control unit inputs a re-switching command to the read signal generation unit, upon receipt of the re-switching command, the read signal generation unit selects the first drive signal, and concurrently with a next start of rotation of the first rotor, the read signal generation unit outputs, as the read signal, a signal synchronized with the first drive signal.

9. The image forming apparatus according to claim 8, wherein based on image data obtained through reading by the image sensor, the control unit determines a time point when a rear end of the paper sheet has passed through the image sensor, or the control unit determines, as the time point when a rear end of the paper sheet has passed through the image sensor, a time point when a preset expected time at which a rear end of the paper sheet is expected to pass through the image sensor has elapsed since detection, by a paper sheet sensor, of passing of the rear end of the paper sheet.

10. A method for controlling an image forming apparatus, comprising steps of:

causing a first motor to rotate at a speed depending on a frequency of a first drive signal, the first motor causing a first rotor that conveys a paper sheet to rotate;

generating the first drive signal;

causing a second motor to rotate at a speed depending on a frequency of a second drive signal, the second motor causing a second rotor to rotate, the second rotor being provided downstream beyond the first rotor in a conveyance direction and conveying the paper sheet;

generating the second drive signal;

operating a reading unit so that, based on a read signal, the reading unit reads line by line the paper sheet being conveyed thereto, the reading unit including an image sensor and being provided between the first rotor and the second rotor;

generating the read signal;

at a time point when the paper sheet has arrived at the first rotor, maintaining the first motor in a stopped state;

after a start of rotation of the first rotor, accelerating a rotational speed of the first motor and subsequently decelerating the rotational speed so that the first drive signal has a reference frequency;

after the first drive signal has been set to have the reference frequency, stopping the first motor before arrival of a succeeding paper sheet at the first rotor;

using, as the reference frequency, such a frequency that a paper sheet conveyance speed of the first rotor becomes a reference speed;

generating the second drive signal so that a paper sheet conveyance speed at which the second rotor conveys the paper sheet becomes the reference speed;

in a first period from after a start of rotation of the first rotor until a preset switching time point, generating the read signal so that, in accordance with a frequency of the first drive signal, every line of the paper sheet is read upon conveyance thereof;

in a second period from the switching time point until a rear end of the paper sheet has passed beyond the image sensor, generating the read signal so that every line of the paper sheet being conveyed at the reference speed is read upon conveyance thereof; and providing the switching time point within a time period in which the second rotor has started to convey the paper sheet and the first drive signal has the reference frequency.

* * * * *